United States Patent
Hentosh et al.

(10) Patent No.: US 8,621,190 B2
(45) Date of Patent: *Dec. 31, 2013

(54) SYSTEM AND METHOD FOR CHANGING A PARTICULAR SYSTEM SETTING DURING A PRE-EXTENSIBLE FIRMWARE INTERFACE INITIALIZATION (PEI) PHASE BASED ON A COMMAND FROM A PEI MODULE (PEIM)

(71) Applicant: Dell Products, LP, Round Rock, TX (US)

(72) Inventors: John Hentosh, Pflugerville, TX (US); Richard M. Tonry, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/684,975

(22) Filed: Nov. 26, 2012

(65) Prior Publication Data

US 2013/0080758 A1 Mar. 28, 2013

Related U.S. Application Data

(63) Continuation of application No. 12/543,189, filed on Aug. 18, 2009, now Pat. No. 8,341,387.

(51) Int. Cl.
*G06F 9/00* (2006.01)
*G06F 9/24* (2006.01)

(52) U.S. Cl.
USPC .................................................. 713/1; 713/2

(58) Field of Classification Search
USPC ........................................................ 713/1, 2
See application file for complete search history.

(56) References Cited

U.S. PATENT DOCUMENTS

| | | | |
|---|---|---|---|
| 6,907,524 B1 | 6/2005 | Huntington, II et al. | |
| 7,222,339 B2 | 5/2007 | Rothman et al. | |
| 7,380,174 B2 | 5/2008 | Mayo et al. | |
| 7,698,547 B1 | 4/2010 | Polyudov | |
| 2004/0025001 A1* | 2/2004 | Stevens et al. | 713/2 |
| 2004/0111597 A1 | 6/2004 | Rothman et al. | |
| 2004/0267708 A1 | 12/2004 | Rothman et al. | |
| 2005/0229160 A1 | 10/2005 | Rothman et al. | |
| 2008/0270779 A1 | 10/2008 | Wilson | |
| 2009/0119498 A1 | 5/2009 | Narayanan | |
| 2011/0047365 A1 | 2/2011 | Hentosh et al. | |

OTHER PUBLICATIONS wiki.phoenix.com, "EFI PEI Services"; 15 pages, Dated Jan. 21, 2009.

* cited by examiner

*Primary Examiner* — Thomas Lee
*Assistant Examiner* — Phil Nguyen
(74) *Attorney, Agent, or Firm* — Larson Newman, LLP (57) ABSTRACT

A method of manipulating a system setting when booting an information handling system can include providing an update request repository that includes a plurality of entries. Each of the plurality of entries can correspond to a particular system setting. A system setting value associated with each entry can be included in a handoff block (HOB) of a plurality of handoff blocks associated with a cache. The method also includes receiving a command from a PEI module (PEIM) indicating a change to be made to a particular system setting at the information handling system. The method also includes creating or changing a particular entry of the update request repository based on the command.

20 Claims, 3 Drawing Sheets

SYSTEM AND METHOD FOR CHANGING A PARTICULAR SYSTEM SETTING DURING A PRE-EXTENSIBLE FIRMWARE INTERFACE INITIALIZATION (PEI) PHASE BASED ON A COMMAND FROM A PEI MODULE (PEIM)

CROSS REFERENCE TO RELATED APPLICATIONS

This application is a continuation of U.S. patent application Ser. No. 12/543,189, entitled "System and Method to Manipulate a System Setting When Booting an Information Handling System," filed on Aug. 18, 2009, the disclosure of which is hereby expressly incorporated by reference in its entirety.

FIELD OF THE DISCLOSURE

This disclosure relates generally to methods and code used by information handling systems, and more particularly to systems and methods to manipulate a system setting when booting information handling systems and machine-executable code for carrying out the methods.

DESCRIPTION OF THE RELATED ART

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

BRIEF DESCRIPTION OF THE DRAWINGS

Skilled artisans appreciate that elements in the figures are illustrated for simplicity and clarity and have not necessarily been drawn to scale. For example, the dimensions of some of the elements in the figures may be exaggerated or minimized relative to other elements to help to improve understanding of particular embodiments. Embodiments incorporating teachings of the present disclosure are illustrated and described with respect to the drawings presented herein.

The use of the same reference symbols in different figures indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile such as random access memory, nonvolatile (read only memory or flash memory) or any combination thereof), one or more processing resources, such as a central processing unit (CPU), hardware or software control logic, or any combination thereof Additional components of the information handling system can include one or more storage devices, one or more communications ports for communicating with external devices as well as various input and output (I/O) devices, such as a keyboard, a mouse, a video display, or any combination thereof. The information handling system can also include one or more buses operable to transmit communications between the various hardware components.

Although referred to as a "device," the device may be configured as hardware, firmware, software, or any combination thereof For example, the device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be firmware (such as any software running on an embedded device, a Pentium class or PowerPC™ brand processor, or other such device) or software (such as any software capable of operating in the relevant environment). The device could also be a combination of any of the foregoing examples of hardware, firmware, or software.

Devices or programs that are in communication with one another need not be in continuous communication with each other unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. In this context, a communicative interaction may be intending to send information, sending information, requesting information, receiving information, receiving a request for information, or any combination thereof. As such, a communicative interaction could be unidirectional, bi-directional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. Whatever form the communicative interaction takes, the network elements involved need not take any specific form. A network element may be a node, a piece of hardware, software, firmware, middleware, some other component of a computing system, or any combination thereof In the description below, a flow charted technique may be described in a series of sequential actions. The sequence of the actions and the party performing the steps may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (such as actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive—or and not to an exclusive—or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

An information handling system and method of using it are described below. An exemplary, non-limiting system description is described before addressing methods of using it. Some of the functionality of modules within the system is described with the system. The utility of the system and its modules will become more apparent with the description of the methods that follow the description of the system and modules.

Figure 1:
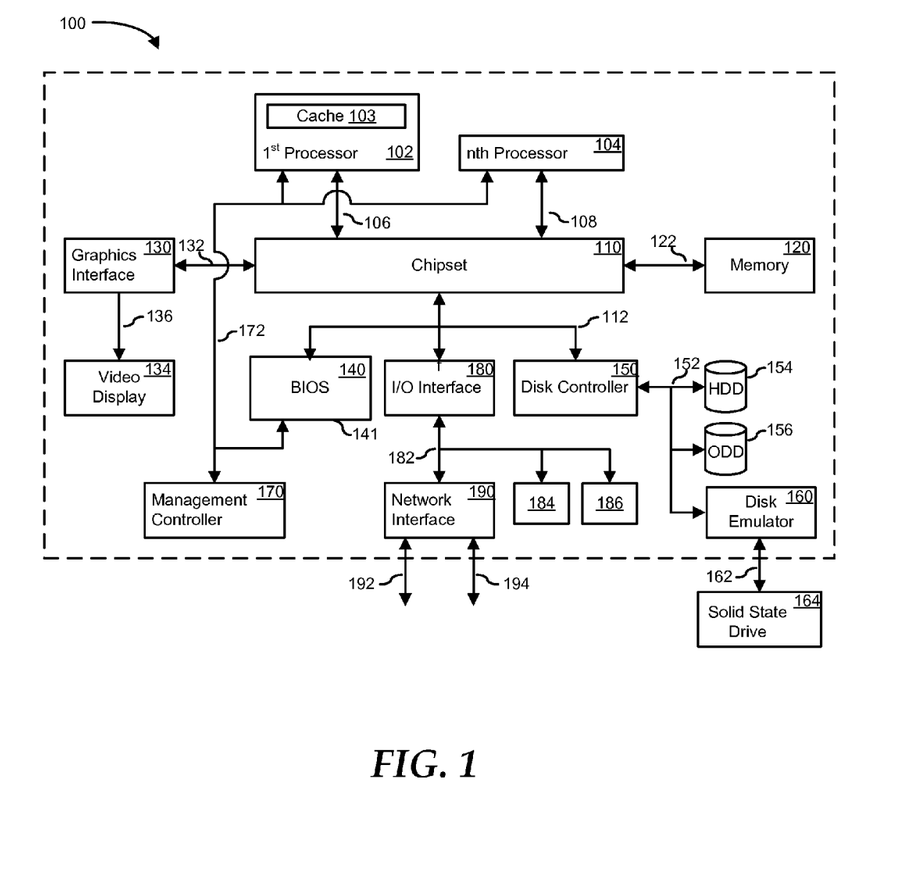
FIG. 1 includes a functional block diagram of an information handling system including a basic input/output system and a main circuit board control module.

FIG. 1 illustrates a functional block diagram of an exemplary embodiment of an information handling system, generally designated as 100. The information handling system 100 can include a processor 102 coupled to a host bus 106, and can further include one or more additional processors, generally designated as an $n^{th}$ processor 104, coupled to a host bus 108. The processor 102 can be coupled to a chipset 110 via the host bus 106 and the $n^{th}$ processor 104 can be coupled to the chipset 110 via the host bus 108. The chipset 110 can support the processors 102 through 104, allowing for simultaneous processing by the processors 102 through 104, and can support the exchange of information within the information handling system 100 during multiple processing operations. In an aspect, the chipset 110 can function to provide access to the processor 102 using host bus 106, and the $n^{th}$ processor 104 using the host bus 108. In another aspect, the chipset 110 can include a dedicated bus (not illustrated) to transfer data between the processor 102 and the $n^{th}$ processor 104.

The information handling system 100 can include a memory 120 coupled to a memory bus 122. In accordance with an aspect, the chipset 110 can be referred to as a memory hub or a memory controller, where the memory 120 can be coupled to the chipset 110 via the memory bus 122. For example, the chipset 110 can include an Accelerated Hub Architecture (AHA) enabled-chipset that can include a memory controller hub and an I/O controller hub. As a memory controller hub, the chipset 110 can be coupled to the host buses 106 through 108, and the memory bus 122 as individual buses, or as part of the same bus (not illustrated). The chipset 110 can also provide bus control and can handle transfers between the host buses 106 through 108, and the memory bus 122. In accordance with another aspect (not illustrated), the information handling system can include a separate memory dedicated to each processor 102 through 104. Each memory can include a memory bus coupled between each processor 102 through 104 and its dedicated memory. In accordance with yet another aspect, the chipset 110 can be generally considered an application specific chipset that provides connectivity to various buses, and integrates other system functions. For example, the chipset 110 can be provided using a chipset that includes two parts: a Graphics and Memory Controller Hub (GMCH) and an I/O Controller Hub (ICH). The chipset 110 can also be packaged as an ASIC.

The information handling system 100 can also include a graphics interface 130 that can be coupled to the chipset 110 using the graphics bus 132. The graphics interface 130 can provide a video display output 136 to a video display 134. In one form, the graphics interface 130 can be an Accelerated Graphics Port (AGP) interface to display content within the video display 134. Other graphics interfaces (not illustrated) may also be used in addition to the graphics interface 130 if needed or desired. The video display 134 can include one or more types of video displays, such as a flat panel display or other type of display device.

The information handling system 100 can also include an I/O channel 112 connected to the chipset 110. The I/O channel 112 can include a Peripheral Component Interconnect (PCI) bus, a PCI-Extended (PCI-X) bus, a high-speed link of PCI-Express (PCIe) lanes, another industry standard or proprietary bus or link, or any combination thereof. In one embodiment, a PCI bus can be operated at approximately 66 MHz, a PCI-X bus can be operated at approximately 133 MHz, and a PCIe link can be operated at approximately 250 million bytes per second (MB/s) per lane in each direction. PCI buses, PCI-X buses, and PCIe links can be provided to comply with industry standards for connecting and communicating between various PCI, PCI-X and PCIe enabled hardware devices, respectively. The chipset 110 can include other buses in association with, or independent of, the I/O channel 112, including other industry standard buses (such as Industry Standard Architecture (ISA), Small Computer Serial Interface (SCSI), Inter-Integrated Circuit ($I^2C$), System Packet Interface (SPI), or Universal Serial Bus (USB), proprietary buses) or any combination thereof.

In an alternate embodiment, the chipset 110 can be a chipset employing a Northbridge/Southbridge chipset configuration (not illustrated). For example, a Northbridge portion of the chipset 110 can communicate with the processors 102 through 104 using the host buses 106 through 108, and can control interaction with the memory 120, the I/O channel 112, and activities for the video graphics interface 130. The chipset 110 can also include a Southbridge portion (not illustrated) of the chipset 110, and can handle I/O functions of the chipset 110. The Southbridge portion can manage basic forms of I/O, such as USB, serial I/O, audio outputs, Integrated Drive Electronics (IDE), ISA I/O, or any combination thereof for the information handling system 100.

The information handling system 100 can also include a basic input/output system (BIOS) module 140 that can be coupled to the I/O channel 112. The BIOS module 140 can include BIOS code operable to detect and identify resources within the information handling system 100, provide the appropriate drivers for those resources, initialize those resources, and access those resources. The BIOS module 140 can be operable during a boot sequence and provide information needed to properly boot the information handling system 100 before, during, and after an operating system for the information handling system 100 is launched. In a particular embodiment, the BIOS module 140 can be included in a persistent memory 141, such as a FLASH memory device, a non-volatile random access memory (NVRAM) device, a complementary metal-oxide semiconductor (CMOS) memory device, another persistent memory device or any combination thereof.

The information handling system 100 can further include a disk controller 150 coupled to the I/O channel 112. The disk controller 150 can include a disk interface 152 that can include other industry standard buses (such as Integrated Drive Electronics (IDE), Parallel Advanced Technology Attachment (PATA), Serial Advanced Technology Attachment (SATA), SCSI, or USB or proprietary buses), or any combination thereof. The disk controller 150 can be coupled to one or more disk drives via the disk interface 152. Such disk drives include a hard disk drive (HDD) 154 or an optical disk drive (ODD) 156 (such as a Read/Write Compact Disk (R/W-CD), a Read/Write Digital Video Disk (R/W-DVD), a Read/Write mini Digital Video Disk (R/W mini-DVD), or another type of optical disk drive), or any combination thereof. The optical disk drive 166 can read a removable data storage medium (such as a Compact Disk (CD), a Digital Video Disk (DVD), a mini Digital Video Disk (mini-DVD), or other optical media). Additionally, the information handling system 100 can include a disk emulator 160 that is coupled to the disk interface 152. The disk emulator 160 can permit a solid-state drive 164 to be coupled to the information handling system 100 via an external interface 162. The external interface 162 can include other industry standard busses, such as a USB or IEEE 1394 (Firewire) or proprietary busses, or any combination thereof. Alternatively, the solid-state drive 164 can be disposed within the information handling system 100.

The information handling system 100 can further include a management controller 170 that can be coupled to the chipset 110 via a system communication bus 172, such as a control bus. The management controller 170 may be on a main circuit board, such as a baseboard, a motherboard, or any combination thereof, integrated onto another component such as the chipset 110, in another suitable location, or any combination thereof. Although not illustrated, another resource, such as the processors 102 or 104, the memory 120, the graphics interface 130, the video display 134, the I/O interface 140, or the disk controller 150, or any combination thereof, can be coupled to the management controller 170. Commands, communications, or other signals may be sent to or received from the management controller 170 by any one or any combination of resources previously described. The management controller 170 can be part of an integrated circuit or a chip set within the information handling system 100.

The information handling system 100 can also include an I/O interface 180 that can be connected to the chipset 110 via the I/O channel 112. The I/O interface 180 can be coupled to a peripheral channel 182 that can be of the same industry standard or proprietary bus or link architecture as the I/O channel 112, or of a different industry standard or proprietary bus or link architecture than the I/O channel 112. As such, the I/O interface 180 can extend the I/O channel 112 capacity when the peripheral channel 182 is the same as the I/O channel 112, or translate information from a type suitable to the industry standard or proprietary bus or link architecture of the I/O channel 112 to a type suitable to a different industry standard or proprietary bus or link architecture, and vice versa, when the peripheral channel 182 is different than the I/O channel 182. Other I/O interfaces (not illustrated) may also be used in addition to the I/O interface 180, if needed or desired.

The peripheral channel 182 can include a bus structure that allows the installation and coupling of additional resources 184 through 186 to the information handling system. In accordance with an aspect (not illustrated), the peripheral channel 182 can also include one or more point-to-point links to the additional resources 184 through 186. The external resources 184 through 186 can include a data storage system, a graphics interface, another suitable resource or any combination thereof. The additional resources 184 through 186 can be on a main circuit board, on separate circuit boards or add-in cards disposed within the information handling system 100, devices that are external to the information handling system 100, or any combination thereof.

The information handling system 100 can also include a network interface device 190 that is coupled to the I/O interface 180 via the peripheral channel 182. The network interface device 190 may be a network interface card (NIC) disposed within the information handling system 100, on a main circuit board, such as a baseboard, a motherboard, or any combination thereof, integrated onto another component such as the chipset 110, in another suitable location, or any combination thereof. The network interface device 190 can include a network channel 192 and a network channel 194. The network interface device 190 can also include additional network channels (not illustrated). In accordance with an aspect, the network channels 192 and 194 are of a different industry standard or proprietary bus or link architecture than the peripheral channel 182, and the network interface device 190 can translate information from a type suitable to the industry standard or proprietary bus or link architecture of the peripheral channel 182 to a type suitable to the industry standard or proprietary bus or link architecture of the network channels 192 and 194, and vice versa. The network channels 192 and 194 can be of industry standard architecture (such as InfiniBand, Fibre Channel, or Gb Ethernet), proprietary channel architecture, or any combination thereof. Other network interface devices (not illustrated) may also be used in addition to the network interface device 190, if needed or desired. The network channels 192 and 194 can be coupled to network resources (not illustrated). The network resource can include another information handling system, a data storage system, another network, a grid management system, another suitable resource or any combination thereof.

In a particular illustrative embodiment, a boot event can occur at the information handling system, such as a power on event, a restart event, or another boot event. The BIOS module 140 is adapted to start executing a boot flow after the boot event but before the chipset 110 and memory 120 begin operating. The boot flow can include a plurality of phases, such as a pre-Extensible Firmware Interface (PEI) phase and a driver execution environment (DXE) phase. In an example, the PEI phase can include initializing a processor, initializing the memory 120, initializing the management controller 170 or another memory controller (not shown), initializing the chipset 110, other functions, or any combination thereof In another example, the DXE phase can begin after the management controller 170 or other memory controller is initialized such that a write driver can be executed to write data to memory 120.

In one embodiment, the BIOS module 140 can include a plurality of PEI modules (PEIMs). A PEIM can be configured to perform a function during the PEI phase of the boot flow, such as initializing a component of the information handling system or changing a system setting at the information handling system. In other embodiments, the BIOS module 140 can include a single PEIM adapted to perform all functions during the PEI phase or PEIMs adapted to provide more than one, but less than all, functions during the PEI phase.

In an illustrative embodiment, system settings at the information handling system can be stored at a system settings store in NVRAM or other persistent memory, such as the persistent memory 141. A PEIM configured to change a particular system setting can allocate a portion of the cache 103, such as a handoff block (HOB). Further, the PEIM can be configured to populate the HOB with a new system setting value, to which a current value of the particular system setting is to be changed during the DXE phase, when a write driver becomes available to write the new system setting value to the system settings store at the NVRAM or other persistent memory.

The BIOS module 140 can be adapted to provide a Variable Services facility. The Variable Services facility provides an update request repository, such as an update request list, which includes a plurality of entries. Each entry corresponds to a system setting and a system setting value included in a HOB is associated with each entry. The Variable Services facility includes a SetVariable routine that a PEIM can call, for example, to establish, change or delete a system setting value associated with an entry of the update request repository. The Variable Services facility can also include a GetVariable routine that a PEIM can call to retrieve and return a most recent value for a system setting, whether the most recent value is stored at the persistent memory 141 or is associated with an entry of the update request repository.

In an illustrative embodiment, the Variable Services facility can receive a SetVariable command from a PEIM to call the SetVariable routine. The SetVariable command can identify a particular HOB that includes a system setting value for the particular system setting. In another embodiment, the SetVariable command can include the system setting value. In response to the SetVariable command, the Variable Services facility searches the update request repository for an entry that corresponds to the particular system setting.

If no such entry is found, the Variable Services facility can determine whether the system setting value included in the particular HOB includes a delete operation to delete a value for the particular system setting stored at the NVRAM or other persistent memory. If so, the Variable Services facility can call a GetVariable routine to determine whether the particular system setting is stored at the NVRAM or other persistent memory. If the particular system setting is found, a new entry is created in the update request repository for the particular system setting, and a delete flag is associated with the new entry. If no entry is found for the particular system setting, and the system setting value included in the particular HOB does not include a delete operation, a new entry is created, and the system setting value included in the particular HOB is associated with the new entry.

If an entry corresponding to the particular system setting is found in the update request repository, and the system setting value included in the particular HOB includes a delete operation, the Variable Services facility can determine whether a delete flag is associated with the entry and, if not, to store a delete flag at the entry. On the other hand, if an entry corresponding to the particular system setting is found in the update request repository, and the system setting value included in the particular HOB does not include a delete operation, the Variable Services facility determines whether the system setting value included in the HOB fits a type of system setting, other attribute, or any combination thereof, associated with the entry. If so, the value included in the particular HOB is associated with the entry. Otherwise, an invalid flag is associated with the entry and a new entry is created and associated with the system setting value included in the particular HOB.

In a particular embodiment, a PEIM can call a GetVariable routine to determine, for example, a most recent value of a particular system setting. The Variable Services facility can receive a GetVariable command or similar command from the PEIM and can search the update request repository for an entry that includes a value for the particular system setting. The GetVariable routine can return the value associated with the entry to the other PEIM when the update request repository includes an entry that includes a value for the particular system setting. Conversely, when the update request repository does not include an entry that includes a value for the particular system setting, the GetVariable routine can retrieve a current value of the system setting from a system setting store and return the current value to the PEI module.

In a particular embodiment, during the DXE phase, each HOB allocated during the PEI phase can be relocated to the memory 120. A write driver can call the Get Variable routine of the Variable Services facility to retrieve each system setting value from the update request repository, and can manipulate a system setting at the information handling system based on the system setting value. For instance, the write driver can change a current value of a particular system setting to a value associated with a particular entry of the update request repository.

Figure 2:
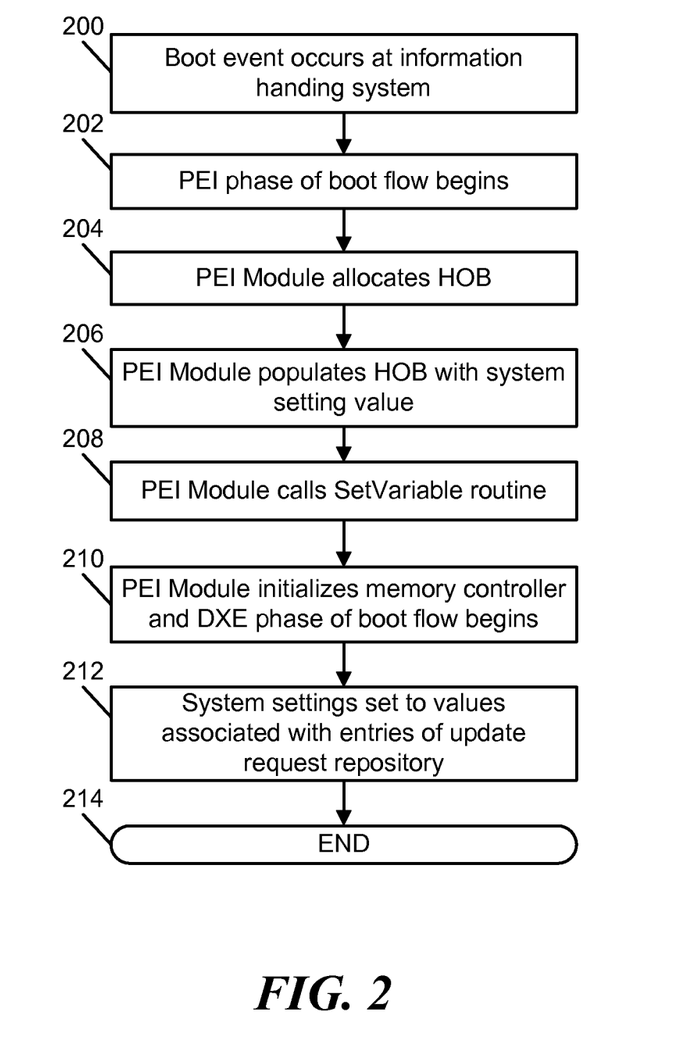
FIG. 2 includes a flow diagram illustrating a particular embodiment of a method of manipulating a system setting when booting an information handling system.

FIG. 2 illustrates a particular embodiment of a method of manipulating a system setting when booting an information handling system. At block 200, a boot event occurs at the information handling system. Moving to block 202, a PEI phase of a boot flow begins at the information handling system. Proceeding to block 204, a PEIM allocates a HOB at a cache, such as a processor cache, cache as RAM, or other cache. Continuing to block 206, the PEIM populates the HOB with a system setting value that includes a value to which a particular system setting at the information handling system is to be changed during a DXE phase of the boot flow.

Advancing to block 208, the PEIM calls a SetVariable routine to add the system setting value to an entry of the update request repository. At block 210, another PEIM initializes a memory controller at the information handling system, and the DXE phase begins Moving to block 212, system settings at the information handling system are set to values associated with entries of the update request repository. The method terminates at 214.

Figure 3:
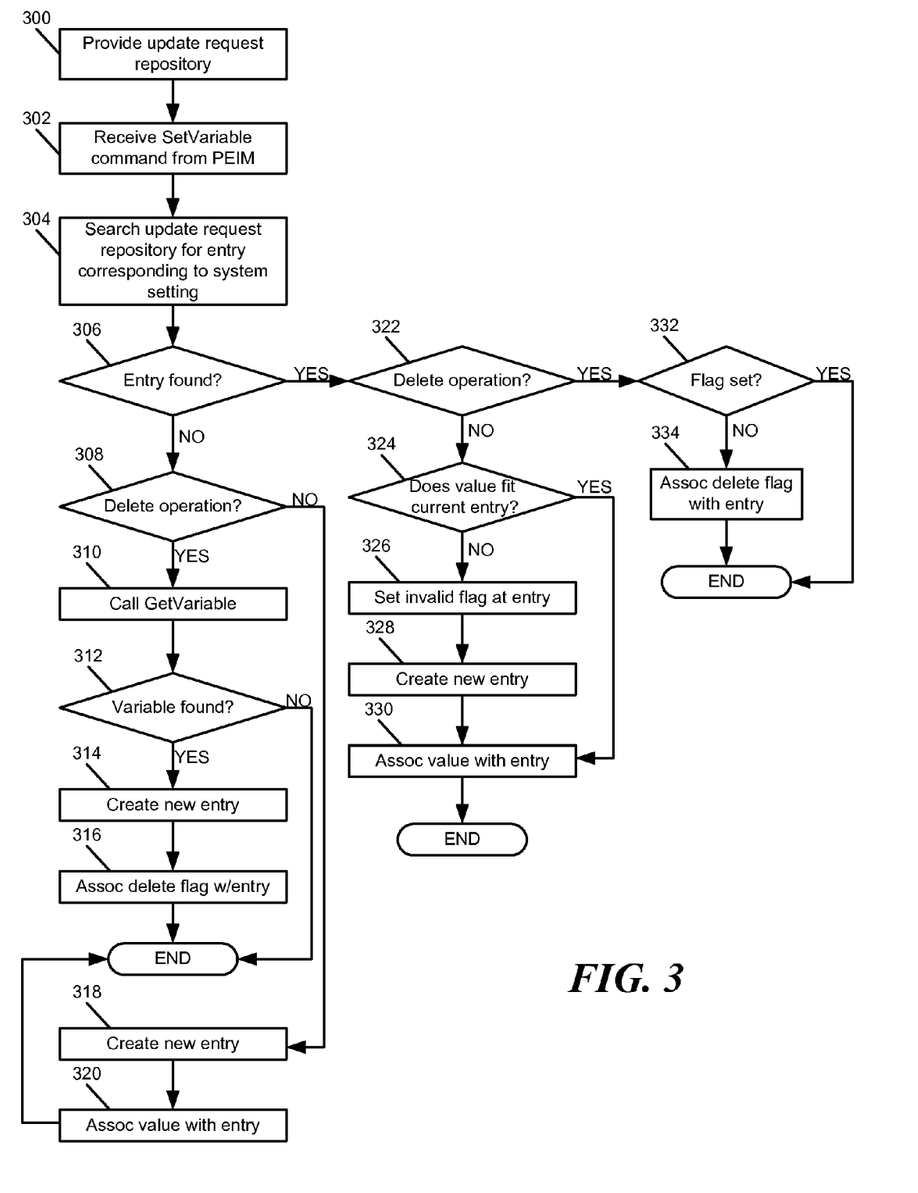
FIG. 3 includes a flow diagram illustrating another particular embodiment of a method of manipulating a system setting when booting an information handling system.

FIG. 3 illustrates another particular embodiment of a method of manipulating a system setting when booting an information handling system. At block 300, a Variable Services facility at the information handling system provides an update request repository, such as an update request list. Moving to block 302, the Variable Services facility receives a SetVariable command from a PEIM. The SetVariable command can include a value of a particular system setting or can identify a HOB that includes the value. Proceeding to block 304, the Variable Services facility searches the update request repository for an entry that corresponds to the particular system setting. Continuing to decision node 306, the Variable Services facility determines whether an entry corresponding to the system setting has been found. If no such entry is found, the method advances to decision node 308, and the Variable Services facility determines whether the value of the system setting includes a delete operation. If not, the method proceeds to block 318.

On the other hand, if no entry corresponding to the particular system setting is found in the update request repository, and the Variable Services facility determines that the value of the system setting includes a delete operation, the method proceeds to block 310 and the Variable Services facility calls a GetVariable routine. Continuing to decision node 312, the Variable Services facility determines whether a current value is found for the particular system setting in persistent memory at the information handling system, where system settings are stored. If a current value is found, the method advances to block 314, and a new entry is created in the update request repository. At block 316, a delete flag is associated with the new entry.

Returning to decision node 306, if an entry corresponding to the particular system setting is not found, and the value of the system setting does not include a delete operation, the method advances to block 318, and a new entry is created. At block 320, the system setting value included in the particular HOB is associated with the new entry.

Returning to decision node 306, if an entry corresponding to the system setting is found in the update request repository, the method moves to decision node 322, and it is determined whether the system setting value included in the particular HOB includes a delete operation. If so, the method proceeds to decision node 332, and it is determined whether a delete flag is associated with the entry. If not, the method moves to block 334, and a delete flag is associated with the entry.

Returning to decision node 322, if the system setting value included in the particular HOB does not include a delete operation, the method moves to decision node 324, and it is determined whether the value of the system setting fits the entry. If so, the method moves to block 330. Conversely, if the system setting value included in the particular HOB does not fit the entry, the method moves to block 326, and an invalid flag is associated with the entry. Proceeding to block 328, a new entry is created, and the system setting value included in the particular HOB is associated with the new entry.

After reading this specification, skilled artisans will appreciate the usefulness and flexibility of the method and system described herein. Configuration information can be exported from an information handling system and imported into the same or different information handling system before an operating system is launch or before a full function version of the operating system is launched. The configuration information can be edited before importation. Thus, the configuration information may be edited for different types or configurations of information handling systems before that particular configuration information is used. The information handling system may ignore or otherwise not use the imported configuration information to the extent such configuration information is not relevant to the particular information handling system. If the imported configuration information does not include a particular piece of configuration information, the information handling system may use a default value that already is present within the information handling system. Thus, the method and system are flexible in that they can be used for many different information handling system, for instances in which the imported configuration information does not have a corresponding component, and can be used when the information handling system includes a component in which the imported configuration information does not have a corresponding variable-value pair.

Many different aspects and embodiments are possible. Some of those aspects and embodiments are described below. After reading this specification, skilled artisans will appreciate that those aspects and embodiments are only illustrative and do not limit the scope of the present invention.

According to a first aspect, a method of manipulating a system setting when booting an information handling system can include, during a PEI phase of a boot flow, providing an update request repository that includes a plurality of entries. Each of the plurality of entries can correspond to a particular system setting. A system setting value associated with each entry can be included in a handoff block (HOB) of a plurality of handoff blocks associated with a cache. The method also includes receiving a command from a PEI module (PEIM) indicating a change to be made to a particular system setting at the information handling system. The method also includes creating or changing a particular entry of the update request repository based on the command.

In an embodiment of the first aspect, the method can include searching the update request repository for an entry that corresponds to the particular system setting. The method can also include when the update request repository does not include an entry that corresponds to the particular system setting, creating the particular entry and associating with the particular entry a system setting value included in a particular HOB.

In another embodiment of the first aspect, the method can include when the update request repository includes a particular entry that corresponds to the particular system setting and when the command indicates that a new system setting value related to the particular system setting is included in a particular HOB, determining whether new system setting value fits the particular entry, associating an invalid indicator with the particular entry when the new system setting value does not fit the particular entry, and associating the new system setting value with the particular entry when the new system setting value fits the particular entry.

In another embodiment of the first aspect, the method can include when the command indicates that a system setting value corresponding to the particular system setting is to be deleted, associating a delete flag with the particular entry.

In another embodiment of the first aspect, a system setting value included in each of the plurality of HOBs can indicate a value to which a system setting is to be changed during a DXE phase of the boot flow.

In another embodiment of the first aspect, the method can include initializing a memory controller at the information handling system. The boot flow can transition to the DXE phase after the memory controller is initialized.

In another embodiment of the first aspect, the command can include a command associated with a SetVariable routine of a Variable Services facility.

According to a second aspect, a system can include an information handling system that can be adapted to provide a Variable Services facility during a PEI phase of a boot flow. The Variable Services facility can include a SetVariable routine configured to write a system setting value included in a HOB to an update request repository during the PEI phase, and can include a GetVariable routine configured to retrieve a value of a system setting during the PEI phase.

In an embodiment of the second aspect, the information handling system can include a persistent memory device adapted to store firmware to provide the Variable Services facility. The persistent memory device can store a plurality of system settings that includes the system setting. The persistent memory device can include CMOS, FLASH memory, non-volatile random access memory (NVRAM) or any combination thereof.

In another embodiment of the second aspect, the update request repository can include a plurality of entries. Each of the plurality of entries can be associated with a system setting value included in a handoff block (HOB) of a plurality of handoff blocks associated with a cache. The cache can include a processor cache, cache as RAM, or a combination thereof.

According to a third aspect, a computer-readable medium can include processor-readable instructions that are executable by a processor to perform a method. The method can include, during the PEI phase of a boot flow at an information handling system, providing an update request repository that includes a plurality of entries. Each of the plurality of entries can correspond to a particular system setting. A system setting value associated with each entry can be included in a handoff block (HOB) of a plurality of handoff blocks associated with a cache. The method also includes receiving a command from a PEI module (PEIM) indicating a change to be made to a particular system setting at the information handling system. The method also includes creating or changing a particular entry of the update request repository based on the command.

In an embodiment of the third aspect, the method can include, during the PEI phase, receiving another command from the PEI module to retrieve a value of the particular system setting, and searching the update request repository for an entry that includes a value for the particular system setting.

In another embodiment of the third aspect, the method can include returning the value associated with the entry to the other PEIM when the update request repository includes an entry that includes a value for the particular system setting.

In another embodiment of the third aspect, the method can include when the update request repository does not include an entry that includes a value for the particular system setting, retrieving a current value of the system setting from a system setting store and returning the current value to the PEI module.

In another embodiment of the third aspect, the update request repository can include an update request list.

In another embodiment of the third aspect, the method can include during a DXE phase of the boot flow, changing a current value of the particular system setting to a value associated with the particular entry of the update request repository.

Note that not all of the activities described above in the general description or the examples are required, that a portion of a specific activity may not be required, and that one or more further activities may be performed in addition to those described. Still further, the order in which activities are listed is not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
   during a pre-extensible firmware interface initialization (PEI) phase of a boot flow at an information handling system:
      providing an update request repository that includes a plurality of entries, wherein each of the entries corresponds to a particular system setting and wherein a system setting value associated with each entry is included in a handoff block (HOB) of a plurality of HOBs associated with a cache;
receiving a command from a PEI module (PEIM) indicating a change to be made to a particular system setting, the command including a value of the particular system setting; and
creating or changing a particular entry of the update request repository based on the command, wherein when the update request repository does not include an entry of the entries that corresponds to the particular system setting, the creating comprises:
creating the particular entry for the particular system setting; and
associating with the particular entry for the particular system setting the value of the particular system setting included in the command.

2. The method of claim 1, further comprising:
receiving a second command from the PEIM indicating a second change to be made to a second system setting; and
when the update request repository includes an entry of the entries that corresponds to the second system setting and when the second command indicates that a new system setting value related to the second system setting is included in one of the HOBs:
determining whether the new system setting value fits the entry of the entries;
when the new system setting value does not fit the entry of the entries, associating an invalid indicator with the entry of the entries; and
when the new system setting value fits the entry of the entries, reading the new system setting value from the one HOB and associating the new system setting value with the entry of the entries.

3. The method of claim 1, further comprising during a driver execution environment (DXE) phase of the boot flow changing a value of the particular system setting to a system setting value of the particular entry of the update request repository based upon the system setting value of the particular entry, the system setting value of the particular entry corresponding to a system setting value included in one of the HOBs.

4. The method of claim 1, wherein the command includes a command associated with a SetVariable routine of a Variable Services facility, the SetVariable routine to receive a specification of a system setting and a specification of a value and to set the system setting to the value.

5. The method of claim 1, further comprising:
receiving a command from the PEIM to obtain a value of a system setting; and
in response to the command:
searching the update request repository for an entry that corresponds to the system setting;
when the searching finds an entry that corresponds to the system setting, returning a system setting value of the entry; and
when the searching does not find an entry that corresponds to the system setting, returning a value of the system setting from a system setting store, the system setting store contained in firmware.

6. The method of claim 5, wherein the command includes a command associated with a GetVariable routine of a Variable Services facility to obtain a value of a system setting.

7. The method of claim 1, further comprising:
receiving another command from the PEIM indicating a change to be made to another system setting, wherein the other command indicates that a new system setting value related to the other system setting is included in one of the HOB; and
setting the value of an entry of the update request repository to the new system setting value included in one of the HOB, wherein the entry of the update request repository corresponds to the other system setting.

8. The method of claim 1, further comprising:
storing a value in an entry of the update request repository, the value not associated with the HOB; and
writing the value of the entry to a driver during a DXE phase of the boot flow.

9. The method of claim 2, wherein the associating the new system setting value with the entry of the entries includes replacing an old system setting value of the entry of the entries with the new system setting value.

10. The method of claim 1, wherein, for each HOB of the information handling system, some entry of the update request repository corresponds to a system setting of the HOB.

11. An information handling system, comprising:
a processor to execute a GetVariable routine;
a system setting store contained in firmware;
a plurality of handoff blocks (HOBs) associated with a cache;
an update request repository that includes entries containing a specification of a system setting and a value, the value included in one of the HOBs; and
a Variable Services facility operable during a pre-extensible firmware interface initialization (PEI) phase of a boot flow, wherein the Variable Services facility includes the GetVariable routine configured to retrieve a value of a system setting from the update request repository during the PEI phase by:
receiving a specification of a system setting;
searching the update request repository for an entry with a specification of the system setting;
when the search finds an entry with a specification of the system setting, returning a system setting value of the entry; and
when the search does not find an entry with a specification of the system setting, returning a system setting value from the system setting store.

12. The system of claim 11, wherein the information handling system includes a persistent memory device adapted to store firmware to provide the Variable Services facility.

13. The system of claim 12, wherein the persistent memory device includes CMOS, FLASH memory, non-volatile random access memory (NVRAM) or any combination thereof.

14. The system of claim 11, wherein the cache comprises a processor cache, cache as RAM, or a combination thereof.

15. A non-transitory computer-readable medium including processor-readable instructions that are executable by a processor to perform a method, the method comprising:
during a pre-extensible firmware interface initialization (PEI) phase of a boot flow at an information handling system:
providing an update request repository that includes a plurality of entries, wherein each of the plurality of entries corresponds to a particular system setting and wherein a system setting value associated with each entry is included in a handoff block (HOB) of a plurality of HOBs associated with a cache;

receiving a command from a PEI module (PEIM) indicating that a system setting value corresponding to a particular system setting is to be deleted;
searching the update request repository for an entry that corresponds to the particular system setting based on the command; and
when the update request repository does not include an entry that corresponds to the particular system setting:
creating the entry for the particular system setting; and
associating a delete flag with the entry.

16. The computer-readable medium of claim 15, wherein the method further comprises, during the PEI phase:
receiving another command from another PEIM to retrieve a value of a system setting; and
searching the update request repository for an entry that includes a value for the system setting.

17. The computer-readable medium of claim 16, wherein the method further comprises returning the value associated with the entry to the other PEIM when the update request repository includes the entry that includes the value for the particular system setting.

18. The computer-readable medium of claim 16, wherein the method further comprises, when the update request repository does not include an entry that includes a value for the system setting, retrieving a current value of the system setting from a system setting store and returning the current value to the other PEIM.

19. The computer-readable medium of claim 15, wherein the update request repository includes an update request list.

20. The computer-readable medium of claim 15, wherein the method further comprises, during a DXE phase of the boot flow, changing a current value of the particular system setting to a value associated with the particular entry of the update request repository.

* * * * *